United States Patent [19] [11] 3,953,195
Harada et al. [45] Apr. 27, 1976

[54] METHOD OF REFINING CARBON-UNSATURATED SYSTEM FERRO-CHROMIUM

[75] Inventors: Morio Harada, Takaoka; Saburo Kojima, Shinminato; Kazumi Ohta, Takaoka; Hiroaki Shimomura, Shinminato, all of Japan

[73] Assignee: Nippon Kokan Kabushiki Kaisha, Tokyo, Japan

[22] Filed: Sept. 9, 1974

[21] Appl. No.: 504,365

Related U.S. Application Data

[63] Continuation of Ser. No. 319,722, Dec. 29, 1972, abandoned.

[52] U.S. Cl. .................................. 75/12; 75/130.5
[51] Int. Cl.² .................... C21C 5/52; C22C 33/04
[58] Field of Search .............................. 75/10–12, 75/130.5

[56] References Cited
UNITED STATES PATENTS

| | | | |
|---|---|---|---|
| 1,586,591 | 6/1926 | Wild | 75/130.5 |
| 2,457,055 | 12/1948 | Loveless | 75/130.5 |
| 2,473,019 | 6/1949 | Erasmus | 75/130.5 |
| 2,557,458 | 6/1951 | Ogan | 75/12 |

*Primary Examiner*—Peter D. Rosenberg
*Attorney, Agent, or Firm*—Moonray Kojima

[57] ABSTRACT

Refining with the requirements that a mixing rate of powder ore to lump ore is prepared in the range of 20 to 50%, the amount of $SiO_2$ in the charging raw materials is readjusted to which the amount of $SiO_2$ in the slag is in the range of 35 to 45% and impedance of volt-ampere between the electrode and the bottom of furnace is more than $1.6 \times 10^{-3} \Omega$ carbon-unsaturated system ferro-chromium of which both S and Si are low can be easily and stably obtained without desulfurizing out of the furnace.

1 Claim, 5 Drawing Figures

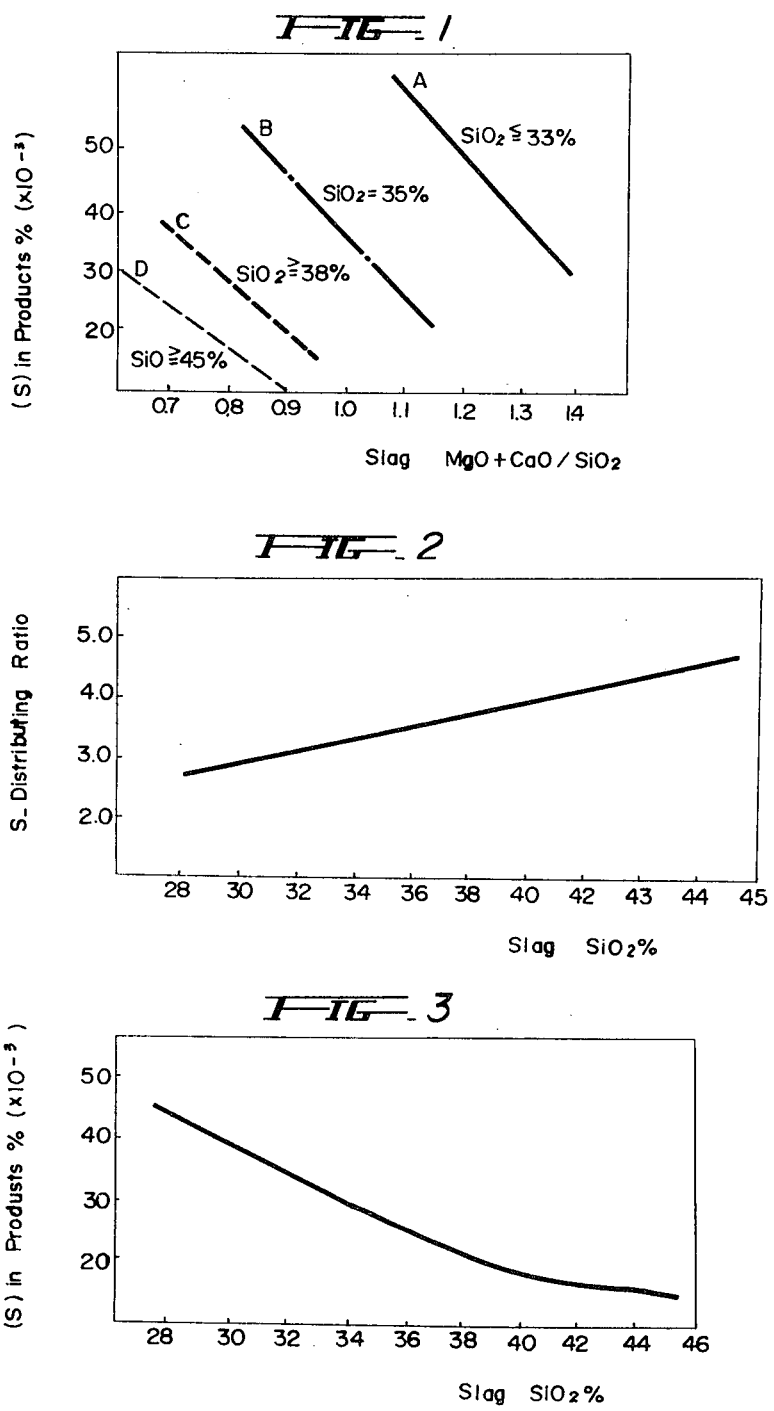

METHOD OF REFINING CARBON-UNSATURATED SYSTEM FERRO-CHROMIUM

This is a continuation of application Ser. No. 319,722, filed Dec. 29, 1972, and now abandoned.

This invention relates to an improved method of refining carbon-unsaturated system ferro-chromium of which S and Si are low and more particularly of easily and stably lowering the S and Si contents without desulfurizing out of the furnace.

It is well known that one of high carbon ferro-chromium is a saturated system of about 8.0% carbon and another, an unsaturated system of less than 6.5% carbon. In the refining of said carbon-unsaturated ferro-chromium, a decarburizing and desiliconizing layer, which is known as the "Bödenfest" layer, is usually utilized to refine said ferro-chromium. Said layer is formed between slag layer beneath reducing layer contiguous to mixing layer and the molten metal zone, wherein said reduced raw materials are decarborized and desiliconized. Such refining method utilizing said Bödefest layer is accompanied with some difficulties on desulfurizing. That is, S content in said produced metal tends to increase with the decarburizing and desiliconizing reactions in said Bödenfest layer while the desulfurization by said slag layer is little expected because the Bödenfest layer lies between said slag and metal layer as an intermediate one as mentioned above. Thus, a low sulfur carbon-unsaturated ferro-chromium has been scarcely obtained.

Therefore, many attempts have been promoted. For example, the raising of basicity is one of said attempts to lower said S content in metal. However, in such operation under high basicity, the required Bödenfest layer is molten to disappear, consequently said carbon-unsaturated system ferro-chromium will be impossible to be manufactured. Conversely, when $SiO_2$ in slag is increased to slag volume increases. It is well-known that such increase brings about the lowering of temperature in furnace and results in having troubles on maintaining a constant operation. Accordingly, it is the ordinary operation to be refined with the slag composition of 28 to 34% $SiO_2$.

Thus, the refining requirements enough to lower S content in metal and to maintain stable operations have not yet been presented. Therefore, it is the usual operation to lower sulfur content in metal by selecting raw materials of low sulfur content or desulfurizing out of the furnace. In the former case, while sulfur content in reducing agent holds about 80% of the total amount contained in each charging raw materials, said reducing agent has been looked for and employed to lower S content in metal. It may be, however, a fact to find difficult in procuring said reducing agent. In the latter case, it is needless to say that said additional process as desulfurized out of the furnace costs much and accordingly, it is undesirable.

Thus, there is not yet presented any method or process enough to lower sulfur content as well as Si with low cost. This invention has been developed to break the above present situation. The features of this invention lie in which; first, a mixing rate of powder ore to the lump ore is prepared in the range of 20 to 50%, secondly, the amount of $SiO_2$ contained in the charging materials is readjusted to which the amount of $SiO_2$ in the slag is in the range of 35 to 45%, and thirdly, impedance of Volt-ampere between the electrode and the bottom of furnace is more than $1.6 \times 10^{-3}\Omega$. According to the above-mentioned requirements, the required carbon-unsaturated ferro-chromium of low sulfur and silicon can be easily and stably obtained without desulfurizing out of the refining furnace.

An object of this invention is to provide a refining method of a carbon-unsaturated ferro-chromium of which the sulfur content is possible to be lowered as well as silicon.

Another object of this invention is to provide a refining method of a carbon-unsaturated ferro-chromium without looking for low S reducing agent or an additional process as desulfurized out of the refining furnace, but with low cost.

Further object and advantages will be apparent from the following description which;

FIG. 1 is a graph showing an interrelation between slag basicity and S content in products.

FIG. 2 shows S-distributing ratio to $SiO_2$ amount in slag.

FIG. 3 shows an interrelation between $SiO_2$ amount in slag and S content in products.

Figure 4:
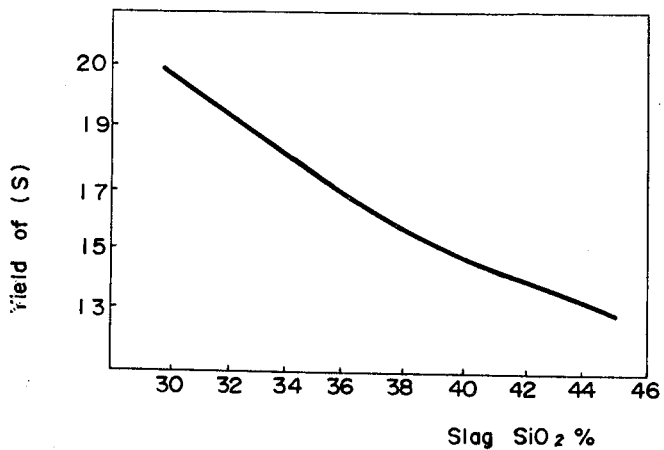
FIG. 4 shows yield of S depending upon $SiO_2$ amount in slag.

As mentioned above, this invention lies in lowering S content as well as Si in metal i.e. carbon-unsaturated ferro-chromium by means of improving the refining requirements. Therefore, many experiments were carried out. The aim of the experiments is to raise Si content in primary formed metal while the increasing of C content and the raising of basicity result in being impossible to obtain the required carbon-unsaturated ferro-chromium. In such experiments, representative examples are as follows. A three-phase electric furnace of 3,600KVA was employed.

TABLE I

|  | charging raw materials (%) | | | |
| --- | --- | --- | --- | --- |
|  | 1 | 2 | 3 | 4 |
| Chromium lump ore | 100 | 75 | 65 | 55 |
| Chromium powder ore | 0 | 25 | 35 | 45 |
| Quartzite | 7.0 | 8.75 | 10.0 | 11.2 |
| Reducing agent | 20 | 20 | 20 | 20 |

TABLE II

| | Composition of the above ores | | | |
| --- | --- | --- | --- | --- |
| | Powder | Lump average | | Powder | Lump average |
| $Cr_2O_3$ | 54.10 | 45.50 | MgO | 11.40 | 13.30 |
| $SiO_2$ | 5.5 | 6.00 | $Al_2O_3$ | 10.90 | 12.90 |
| FeO | 14.80 | 16.70 | P | 0.005 | 0.006 |
| CaO | 0.10 | 1.20 | S | 0.007 | 0.017 |

Table III

| | Refining requirements and results | | | |
| --- | --- | --- | --- | --- |
| | 1 | 2 | 3 | 4 |
| [Cr] | 67.2% | 67.0% | 66.9% | 67.0% |
| [C] | 5.7 | 5.7 | 5.8 | 5.9 |

Table III-continued

| | | Refining requirements and results | | | |
| --- | --- | --- | --- | --- | --- |
| | | 1 | 2 | 3 | 4 |
| Metal | [Si] | 1.9 | 1.48 | 1.30 | 1.30 |
| | [P] | 0.028 | 0.028 | 0.028 | 0.028 |
| | [S] | 0.036 | 0.028 | 0.022 | 0.021 |
| Slag | (Cr) | 2.7 | 2.7 | 2.7 | 2.7 |
| | ($SiO_2$) | 32 | 35 | 37 | 41 |
| | (CaO) | 4.0 | 3.8 | 3.8 | 3.8 |
| | (FeO) | 1.3 | 1.1 | 1.1 | 1.1 |
| | (MgO) | 33 | 30 | 28 | 28 |
| | ($Al_2O_3$) | 25 | 25 | 24 | 25 |
| S-Yield | | 19.5% | 17.0% | 15.0% | 13.5% |
| Impedance | | $1.36\times10^{-3}\Omega$ | more than $1.6\times10^{-3}\Omega$ | more than $1.7\times10^{-3}\Omega$ | more than $1.8\times10^{-3}\Omega$ |
| Power | | 3900Kw/h | 3800Kw/h | 3800Kw/h | 3800Kw/h |

Referring now to the above tables, it will be discovered that there are remarkable differences between example 1 and example 2 to 4. The differences appear in the mixing rate of powder ore, the $SiO_2$ amount in slag the impedance and Si content and S content in metal as the results. First, in the mixing rate, amount of said powder ore in example 2 and 4 is 25 to 45% while that of example 1 is 0%, i.e. 100% lump ore. Secondly, in said composition of slag, $SiO_2$ amount in said example 2 and 4 is 35 to 41% while that of said example 1 is 32%. Thirdly, in said impedance, that of said example 2 and 4 is more than $1.6\times10^{-3}\Omega$ to $1.36\times10^{-3}\Omega$ of said example 1. As a result, S content in said example 2 and 4 is lowered to be less than 0.028% while that of example 1 is 0.036% and Si, 1.46% – 1.30% to 1.9%. Thus, it is confirmed that each of said mixing rate of powder ore, said $SiO_2$ amount in slag and said impedance of volt-ampere between the electrode and the bottom of furnace plays an important part in the refining requirements of obtaining a carbon-unsaturated ferrochromium.

Being based on the above-mentioned examples and other experiments (not shown), the refining requirements of this invention are characterized in that a mixing rate of powder ore to lump ore is prepared in the range of 20 to 50%. The amount of $SiO_2$ contained in the charging materials is readjusted to which $SiO_2$ amount in the slag is in the range of 35 to 45% and impedance of volt-ampere between the electrode and the bottom of furnace is more than $1.6\times10^{-3}\Omega$. The reasons that said refining requirements are provided as mentioned above are as follows.

As shown in example 1, when refined with 100% lump ore many defects came out. First, such refining causes the forming and raising of a bottom layer which is based on a tendency of solidifying molten metal and slag or accumulating non-molten ore. It will be needless to say that constant and stable refining operations become difficult. Secondly, the sulfur content in metal increases rather than that of the charging raw materials. Such phenomena should be avoided. Accordingly, some amount of said powder ore must be mixed to said lump ore. In this invention, a mixing rate of said powder ore settled to be in the range of 20 to 50%. In such case, it is recommended that a particle size of all powder ore are prepared to be less than 10mm. When the mixing rate of said powder ore is less than 20%, fusible effect by mixing scarcely comes out. However, when said rate is more than 50%, it is confirmed that there is little effect corresponding to the increasing of said mixing rate and said refining operations is in difficulty by a extreme change for the worse of permeability. Therefore, said mixing rate should be in the range of 20 to 50%. The amount of $SiO_2$ in slag exerts a serious influence upon desulfurization. FIG. 1 shows a relation between said slag basicity and S content in products. It is as mentioned above that in the present refining process, the increasing of $SiO_2$ amount in slag brings a bad influence upon said refining, therefore, it is refined with $SiO_2$ amount of about 34%, i.e. a solid line A or B in FIG. 1. That is, except the above mentioned difficulties of said refining process, it tends to increase C content in products and the lowering of S content is scarcely expected for increasing $SiO_2$ amount in slag, because S content in raw materials is high at first. This invention has succeeded in breaking said difficulties. This is based on the prepared mixing of powder ore as mentioned above and shown in the example 2 and 4. Thus, $SiO_2$ amount in slag is possible to be increased 35 to 45% as shown as B, C and D line in FIG. 1. Such amount of $SiO_2$ in slag is easily obtained by readjusting said charging raw materials, e.g. quartzite. In such case, A S behavior with a change of $SiO_2$ amount in slag, i.e. slag basicity, is as shown in FIGS. 2 and 4. According to FIG. 2, when $SiO_2$ amount in slag is more than 35%, a distributing ratio of S reaches more than about 4.0. It is needless to say that the above ratio shows the removing of S from said raw materials to said slag, consequently the lowering of S in products. S% in products depending upon the above ratio is as shown in FIG. 3 and a metal of less than 0.03% S can be easily obtained. S-yield in such case lowers as said $SiO_2$ in slag increase and reaches less than about 16%.

Figure 5:
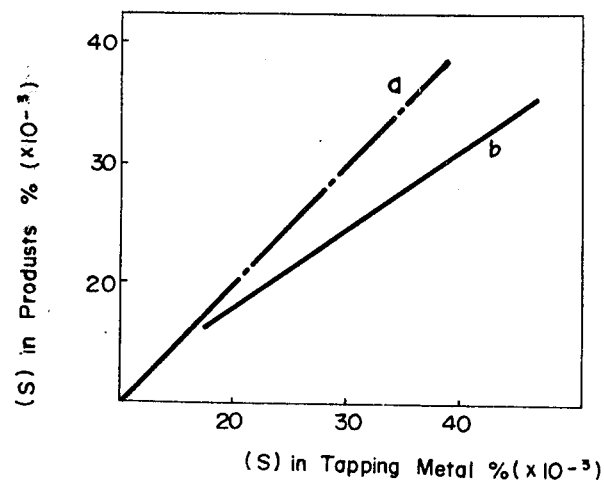
FIG. 5 is a graph showing desulfurizing effect based on the lowering of slag viscosity.

Further merit with the above-mentioned mixing rate of powder ore and $SiO_2$ amount in slag is to carry the lowering of slag viscosity. A desulfurizing effect based on the lowering of said viscosity is shown in FIG. 5. That is, said effect is improved as shown with a solid line b to one dotted line a showing that S-ratio of a product to a tapping metal is 1:1 as an example in a settler. Such lowering of said viscosity further brings a desulfurizing effect with recontact of metalslag out of the furnace.

And moreover, said mixing rate and $SiO_2$ amount bring a good influence upon the refining process. That is, said impedance is possible to be raised to $1.6\times10^{-3}\Omega$ as shown in examples 2 and 4. Consequently, the melting of said raw materials becomes sooner and brings the lowering of consumption power as shown in Table III. According to this invention, there are no bad influences for said refining operations as seen in the prior art and carbon-unsaturated ferro-chromium of low sulfur and silicon can be obtained with ease and stability.

What is claimed is:

1. In a process of manufacturing carbon unsaturated ferro-chromium employing an electric furnace having an electrode and a bottom, wherein is contained a molten metal layer comprising Fe, Cr, C, a slag layer comprising CaO, MgO, $SiO_2$ and $Al_2O_3$, a Bödenfest layer, and a mixing layer, and wherein is charged raw materials comprising chromium ores, reducing agent, silica and lime; the improvement comprising the combination of steps of A. controlling the composition of the charging raw material prior to charging of same into said furnace so that the chromium ore has 20 to 50% of particles sizes less than 10 mm whereby the chromium ore particles 10 mm and above are held in the Bödenfest layer and the chromium ore particles less than 10 mm are fused in the molten metal layer, thereby to enable increased silicon content in the slag layer and increased impedance between said electrode and said bottom;

B. adjusting the $SiO_2$ content in the charging material charged into said furnace to maintain the content of $SiO_2$ in the slag layer at between 35 to 45%, thereby to prevent the Bödenfest layer from becoming molten and thereby enable the Bödenfest layer to effectively decarburize and desiliconize, and thereby to enable the slag layer to effectively desulphurize; and C. controlling the electric current applied to the furnace such that the impedance between said electrode and said bottom is more than $1.6 \times 10^{-3}$ ohms, thereby to prevent said molten layer from rising and interfering with the action of said slag layer and said Bödenfest layer and thereby improve heating efficiency of the furnace.

* * * * *